United States Patent
Paithankar et al.

(10) Patent No.: US 8,890,929 B2
(45) Date of Patent: Nov. 18, 2014

(54) DEFINING ACTIVE ZONES IN A TRADITIONAL MULTI-PARTY VIDEO CONFERENCE AND ASSOCIATING METADATA WITH EACH ZONE

(75) Inventors: Anand Paithankar, Pune (IN); Srinivasan Narayanan, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 487 days.

(21) Appl. No.: 13/275,433

(22) Filed: Oct. 18, 2011

(65) Prior Publication Data

US 2013/0093835 A1   Apr. 18, 2013

(51) Int. Cl.
*H04N 7/14* (2006.01)
*H04N 7/15* (2006.01)

(52) U.S. Cl.
CPC .................................... *H04N 7/152* (2013.01)
USPC .................. 348/14.09; 348/14.01; 348/14.08; 348/14.11; 370/260; 379/202.01; 709/204

(58) Field of Classification Search
CPC ...... H04N 7/14–7/157; H04N 7/173–7/17363; H04M 3/56–3/569; H04M 7/0027; H04M 7/0039; H04M 7/0051; H04M 9/001; H04M 9/02; H04M 9/04; H04M 9/06; H04M 11/06
USPC ..................... 348/14.01–14.16; 370/259–271, 370/351–357; 709/201–207, 217–248
See application file for complete search history.

(56) References Cited

U.S. PATENT DOCUMENTS

| | | | |
|---|---|---|---|
| 5,835,129 A | 11/1998 | Kumar | |
| 6,677,979 B1 * | 1/2004 | Westfield | 348/14.12 |
| 7,113,200 B2 * | 9/2006 | Eshkoli | 348/14.07 |
| 7,139,015 B2 * | 11/2006 | Eshkoli et al. | 348/14.07 |
| 7,176,957 B2 * | 2/2007 | Ivashin et al. | 348/14.09 |
| 7,800,642 B2 * | 9/2010 | Eshkoli et al. | 348/14.08 |
| 7,827,494 B1 * | 11/2010 | Hedayatpour et al. | 715/742 |
| 8,274,543 B2 * | 9/2012 | Lindbergh | 348/14.01 |
| 2007/0168413 A1 * | 7/2007 | Barletta et al. | 709/203 |
| 2007/0188596 A1 * | 8/2007 | Kenoyer | 348/14.08 |
| 2008/0062252 A1 * | 3/2008 | Kawamura et al. | 348/14.09 |
| 2010/0225737 A1 * | 9/2010 | King et al. | 348/14.09 |
| 2013/0050399 A1 * | 2/2013 | Gorzynski et al. | 348/14.08 |

OTHER PUBLICATIONS

Lin et al. "Dynamic Region of Interest Transcoding for Multipoint Video Conferencing," IEE Transactions on Circuits and Systems for Video Technology, Oct. 2003, vol. 13, No. 10, pp. 982-992.

* cited by examiner

*Primary Examiner* — Hemant Patel
(74) *Attorney, Agent, or Firm* — Sheridan Ross P.C.

(57) ABSTRACT

A conference system provides metadata about the display of a multimedia stream to allow communication endpoints to control the format of a video conference. A multipoint control unit (MCU) can provide metadata that describes the display layout and other information about the multimedia stream. After setting up the conference, the MCU can generate a layout description in eXstensible Markup Language (XML) that can be sent to and understood by the communication endpoints. The communication endpoints can read and interpret the XML metadata to determine how the display layout is configured. If desired by the user, the communication endpoint can change the display layout or other multimedia stream function based on the received metadata.

19 Claims, 13 Drawing Sheets

DEFINING ACTIVE ZONES IN A TRADITIONAL MULTI-PARTY VIDEO CONFERENCE AND ASSOCIATING METADATA WITH EACH ZONE

BACKGROUND

Communication devices or communication endpoints that display video conferences traditionally receive a single resultant stream of video from a central controller, referred to as a multipoint control unit (MCU). Generally the communication endpoints cannot identify the other participants inside that video stream or manipulate the video stream. Information about the video display layout is not available to the communication endpoints. The MCU typically delivers a video stream having a display composed of several "panes" of video from different communication endpoints and sends this composite display in a mixed video stream. Unfortunately, in this environment, each participant cannot individually control the display of the video conference. Instead, the participants each receive a standard layout, regardless of whether that layout is suitable for the user or not.

SUMMARY

It is with respect to the above issues and other problems that the embodiments presented herein were contemplated. Embodiments described in the present application provide a system and method for providing metadata about the display of a multimedia stream to allow communication endpoints to control the display & format parameters of a video conference. A MCU can provide metadata that describes the display layout and other information about the multimedia stream. After setting up the conference, the MCU can generate a layout description in XML that can be sent to and understood by the endpoints. The endpoints can read and interpret the XML metadata to determine how the display layout is configured. If desired by the user, the endpoint can change the display layout or other multimedia stream function.

In embodiments, the MCU transports metadata, associated with the conference multimedia stream, to each endpoint. An endpoint can use the MCU supplied metadata to define and render the active zones representing each participant in the video conference. The endpoint can associate context and properties with each active zone and/or participant. Then, embodiments provide a method for an endpoint to configure properties of an active zone. The endpoint may communicate a request, based on the configuration, for changing the properties of the active zone to the MCU. The MCU can then change the properties of the active zone, create a new resultant stream, and transport the new resultant stream to the endpoint The MCU is operable to communicate an XML metadata document using any data transport protocol. The XML metadata document describes the layout of the resultant conference stream to each participant. The metadata is sent exclusive of the conference video that is sent to the endpoints. Thus, the MCU makes a new communication with the metadata. The metadata explains the constitution of the resultant stream. The MCU may provide a list of possible parameters that are available, valid ranges of each parameter, and the current value for the parameter. Parameters can be associated with the entire conference or with each participant. The range of each parameter will be based on a number of factors, including: the session negotiation, the original input stream's properties, network capabilities, policies, etc.

As an example, assume a video conference is started between Alice, John, David, and an external participant. Note that MCU sends a single stream to each of the endpoints associated with Alice, John, David, and the external participant. From the perspective of a single endpoint, e.g., Alice's endpoint, the change to the display occurs as follows. Alice's endpoint receives the metadata out of band and uses the metadata to define the active regions for each of the participants (remote zone). Alice can create one active zone for the local video (local zone), which is usually super imposed over the remote video. Alice's endpoint can render the active regions by marking each participant using the information received in the metadata. One method of marking the participants is to draw borders around the individual constituent portions. The endpoint can use different schemes to identify local and external callers, moderators or non-moderators, etc. Against each active zone, the endpoint can display the metadata and/or properties associated with that participant, as received in the metadata from the MCU. Using an identifier or name in the metadata as a key, the endpoint can extract other contextual information about the participant and display the contextual information as needed.

An active zone can comprise content (e.g. a video channel) from a participant (with associated audio). The content for the active zone can comprise the video channel data and context information, which may be metadata; the context information is associated with and describes the participant in the active zone. The downlink data sent to an endpoint may comprise a stream of multimedia from the MCU and a different out-of-band signal stream from the MCU to convey other data, such as the context information. Both the multimedia stream and the out-of-band single may be bidirectional. Any server side or MCU transformation and/or rescaling can modify the boundaries of the active zones. The MCU can re-communicate the changes to the layout information when such transformation occurs. Any local transformation and/or rescaling may modify the boundaries of the active zones. The endpoint can locally update the zones when a local transformation occurs. If a server transformation occurs, the co-ordinates defining the display space of the layout are changed; hence, the endpoint may have to re-accomplish the local transformations.

Endpoints can modify certain properties of a zone and communicate the modification to the MCU at runtime. Using local device capabilities, the endpoint can provide a way for the properties of a zone to be modified. Thus, upon receiving input from a touch user interface device or a pointer, an active zone can be selected and the selected zone's properties can be configured. The configuration can change video properties and layout properties. The border of the selected region can provide the actionable area where a user's "click" and/or touch indicates that a modification is desired in the actionable area to modify the properties. A list of properties can be included in the metadata and provided to the user for changing in the actionable area. The properties can include minimizing or maximizing the active zone, changing the frames per second (fps), changing the quality, changing the contrast etc. The properties that can be changed may depend on which zone is selected. The list of changeable properties for the active zones can be communicated in the XML body of the metadata sent by the MCU.

The changes can be communicated from the endpoint to the MCU via a second XML document. Receiving the XML document from the endpoint can cause the MCU to create a new stream with the modified properties for the endpoint. Note that the conference has a single stream from the MCU to the endpoint and the changes to the zones are incorporated within the negotiated parameters of the conference. The proposed embodiments introduce a capability for each endpoint to control the content generation step at the MCU. Depending on each participant's choice, the stream sent to the endpoint will diverge from the other downlink streams that the MCU creates.

Certain changes to the multimedia stream may require a renegotiation at a session level. For most cases, the changes are transparent to session management and/or upper layers of the conference. For example, video from a certain remote participant can be brightened, frozen, changed into a thumbnail, etc. Further, video from a selected remote participant can be viewed at a higher fps and/or quality compared to the other participant streams, even though all of the participant streams are delivered within a single video stream. Parameters that may be modified with the remote participant zone can be encompassed in a context of interactions. The context of interactions can include: menus to initiate side bar conference; history of past interactions; instant messaging, email, and other communications integrated with the context engine, etc. In other examples, a method may be available at the endpoint to locally mute the remote participant's video, such that the video is not displayed. When muted, the remote participant's video may be collapsed into an icon or thumbnail. Selecting the complete remote zone can focus the context of the meeting, that is, calendar invites may be displayed, related emails may be displayed, etc.

The term "conference" as used herein refers to any communication or set of communications, whether including audio, video, text, or other multimedia data, between two or more communication endpoints and/or users. Typically, a conference includes three or more communication endpoints.

The term "communication device" or "communication endpoint" as used herein refers to any hardware device and/or software operable to engage in a communication session. For example, a communication device can be an IP-enabled phone, a desktop phone, a cellular phone, a personal digital assistant, a soft-client telephone program executing on a computer system, etc. In embodiments, the communication endpoint is a computer system as described in conjunction with FIGS. 7 and 8.

The term "multipoint control unit (MCU)" as used herein refers to any hardware, software, or a combination of hardware and software operable to conduct, manage, execute, or otherwise hold a conference between two or more communication endpoints and/or one or more other MCUs. The MCU may be a server or computer system as described in conjunction with FIGS. 7 and 8. The MCU can be a part of a conference bridge used to conduct conferences.

The term "settings" as used herein refers to any configuration or characteristic of a MCU and/or communication endpoint. Settings can include static characteristics that do not change or dynamic characteristics that may vary depending on the configuration of the conference. An example of static setting may be the IP address of the communication endpoint. An example of a dynamic setting can be the codec used during a conference by the communication endpoint.

The term "network" as used herein refers to a system used by one or more users to communicate. The network can consist of one or more session managers, feature servers, communication endpoints, etc. that allow communications, whether voice or data, between two users. A network can be any network or communication system as described in conjunction with FIGS. 6 and 7. Generally, a network can be a local area network (LAN), a wide area network (WAN), a wireless LAN, a wireless WAN, the Internet, etc. that receives and transmits messages or data between devices. A network may communicate in any format or protocol known in the art, such as, transmission control protocol/internet protocol (TCP/IP), 802.11g, 802.11n, Bluetooth, or other formats or protocols.

The term "database" or "data model" as used herein refers to any system, hardware, software, memory, storage device, firmware, component, etc., that stores data. The data model can be any type of database or storage framework described in conjunction with FIGS. 6 and 7, which is stored on any type of non-transitory, tangible computer readable medium. The data model can include one or more data structures, which may comprise one or more sections that store an item of data. A section may include, depending on the type of data structure, an attribute of an object, a data field, or other types of sections included in one or more types of data structures. The data model can represent any type of database, for example, relational databases, flat file databases, object-oriented databases, or other types of databases. Further, the data structures can be stored in memory or memory structures that may be used in either run-time applications or in initializing a communication.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "in communication with" as used herein refers to any coupling, connection, or interaction using electrical signals to exchange information or data, using any system, hardware, software, protocol, or format.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" or "computer program product" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
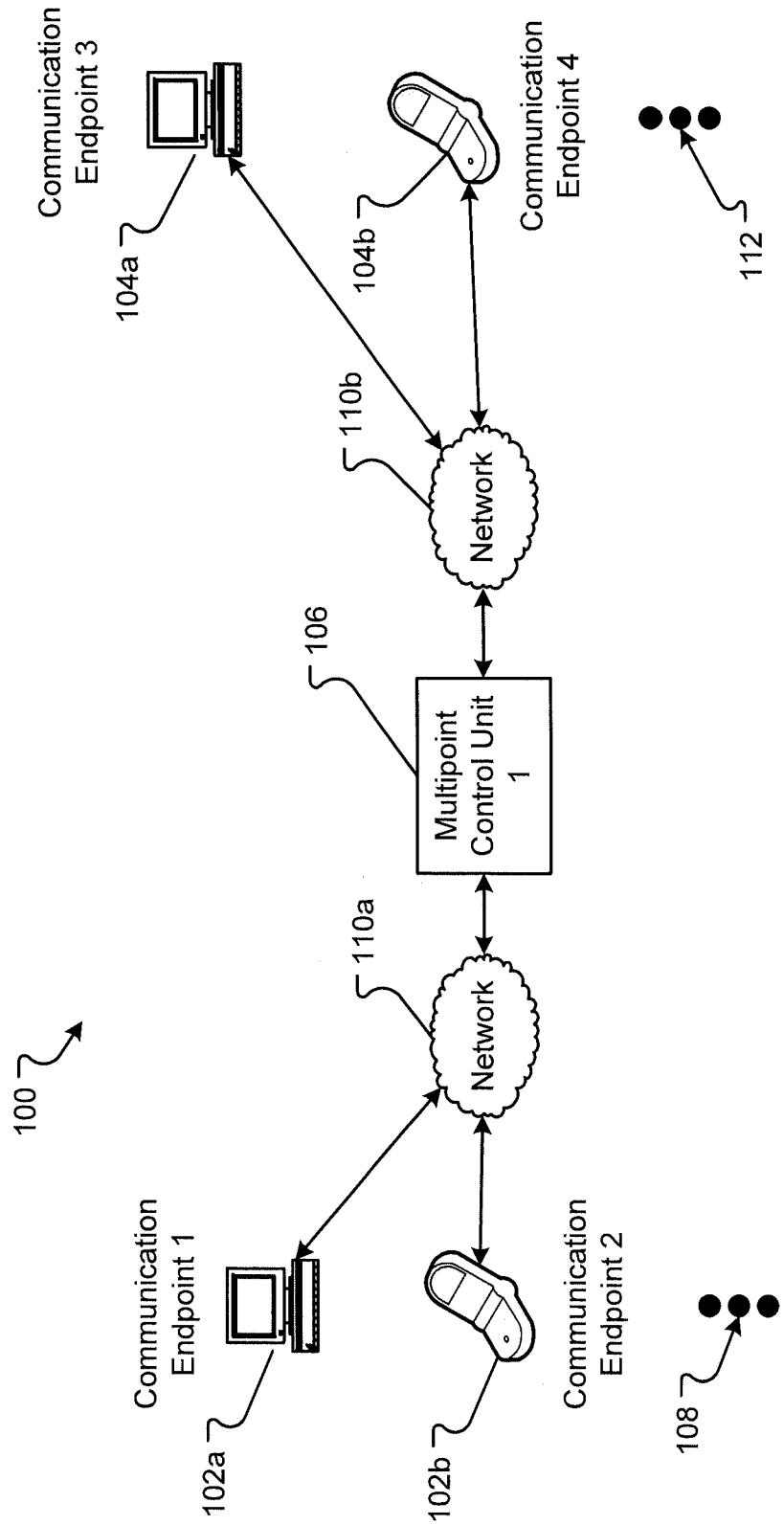
FIG. 1 is a block diagram of an embodiment of a system for conducting a conference.

An embodiment of a system 100 for conducting a conference is shown in FIG. 1. The system 100 can include at least one MCU 106 and at least two communication endpoints 102 and/or 104. The MCU 106 can be in communication with one or more communication endpoints 102a, 102b, 104a, and/or 104b. There may be more or fewer communication endpoints 102 and/or 104, in communication with MCU 106, than those shown in FIG. 1, as represented by ellipses 108 and/or 112.

The communication endpoints 102 or 104 can communicate with the MCU 106 through one or more networks 110a and/or 110b. The networks 110 can represent local area networks (LAN), wide area networks (WAN), public switched telephone network, the Internet, other types of data or telephony networks, or other networks capable of communicating data bi-directionally between the communication endpoints 102/104 and the MCU 106.

Figure 2A:
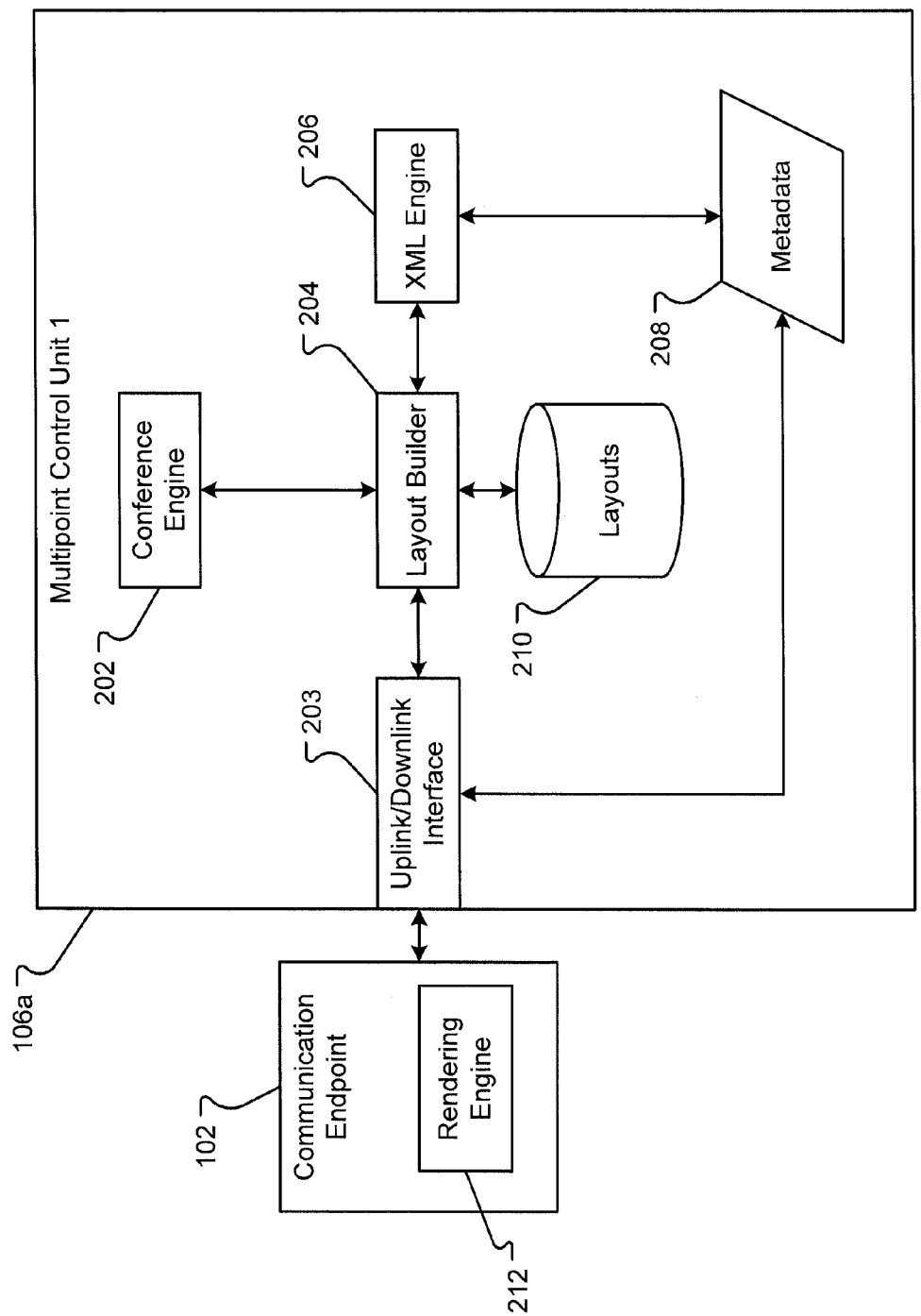
FIGS. 2A and 2B are block diagrams of embodiments of an MCU and/or a communication endpoint operable to change the display characteristics of a conference.

An embodiment of a MCU 106 is shown in FIG. 2A. The MCU 106 can execute one or more modules, which may be hardware and/or software, to conduct a conference. The MCU 106 can execute a conference engine 202, which may conduct one or more conferences. For example, conference engine 202 can conduct a conference with a communication endpoint 102 and at least one other communication endpoint 104. The conference engine 202 can link two or more communication endpoints 102 in a conference 204 to transfer data between the two communication endpoints 102 during the conference 204. Thus, the conference engine 202 can receive and broadcast data with and amongst the communication endpoints 102.

To establish a conference, the conference engine 202 communicates with other conference engines. The conference engine 202 is operable to initialize and conduct the conference with a second MCU 106 and/or two or more communication endpoints 102. Thus, the conference engine 202 is operable to create a link through a network 110 to exchange data (e.g., audio data, video data, or other multimedia data) with the communication endpoints 102. Data received from the communication endpoints 102 can be consolidated into a single downlink stream and then distributed as part of the conference. Thus, audio data, video data, or other data received by the MCU 106 can be communicated through the conference engine 202 to the communication endpoints 102 that are part of the conference.

An uplink and downlink interface 203 is operable to communicate with communication endpoint 102. The uplink and downlink interface 203 can stream multimedia data, associated with a video conference, between the communication endpoint 102 and MCU 106. The uplink multimedia stream can be the stream of video, data, and/or audio from communication endpoint 102 sent to MCU 106 to be integrated into the conference downlink stream. Thus, the downlink multimedia stream consists of the integrated data from the two or more communication endpoint multimedia streams. The downlink stream includes all the multimedia data needed to display or broadcast the conference, including the video data, audio data, and any other data needed for the conference. The uplink and downlink interface 203 can communicate with a layout builder module 204.

The metadata file 208, created by the XML engine 206, may also be sent to the uplink/downlink interface 203, which can communicate the metadata file 208 to the communication endpoint 102. The uplink/downlink interface 203 can use any of a variety of communication protocols to communicate the metadata file 208. Thus, uplink/downlink interface 203 can communicate using transport control protocol (TCP), real time transfer protocol (RTP), hypertext transfer protocol (HTTP), or other types of communication protocols. The metadata information 208 may be sent to the communication endpoint 102 to be used by the rendering engine 212.

The layout builder module 204 is operable to create the layout of the display for the conference video. Thus, the layout builder module 204 may establish and receive the uplink and downlink streams and determine to which portions of the layout the uplinked multimedia streams may be assigned. This information may be assigned to the layout, and the layout builder module 204 determines the vectors for the zones or regions within the display to which the different multimedia streams are assigned. The layout allows the conference engine 202 to interweave the data for the different sections of the display. The layout builder module 204 can communicate the layout dimensions and characteristics to the XML engine 206. The layout builder module 204 may also store one or more layouts in a layout database 210, which can be any database as described in conjunction with FIGS. 7 and 8. Thus, the layout database 204 can store historical layouts that may be re-used to create new layouts or re-establish old layouts.

The XML engine 206 is operable to determine one or more items of metadata to describe the layout provided by the layout builder module 204 and the multimedia stream created by the conference engine 202. The XML engine 206 can extract information from both the layout builder module 204 and the conference engine 202 to determine how the display is being presented in the video conference. The extracted information is then inserted and formatted into a document or metadata file 208. In embodiments, the metadata file 208 is an XML document. In other embodiments, the metadata file 208 is presented in some other format.

The rendering engine 212 can determine the component parts of the conference display based on the metadata information 208. The rendering engine 212 may then extract and change the different components of the display based on user settings for the communication endpoint 102. The rendering engine 212 can change the display locally for the communication endpoint 102 based on the metadata 208 that describe the multimedia stream sent from the conference engine 202.

Figure 2B:
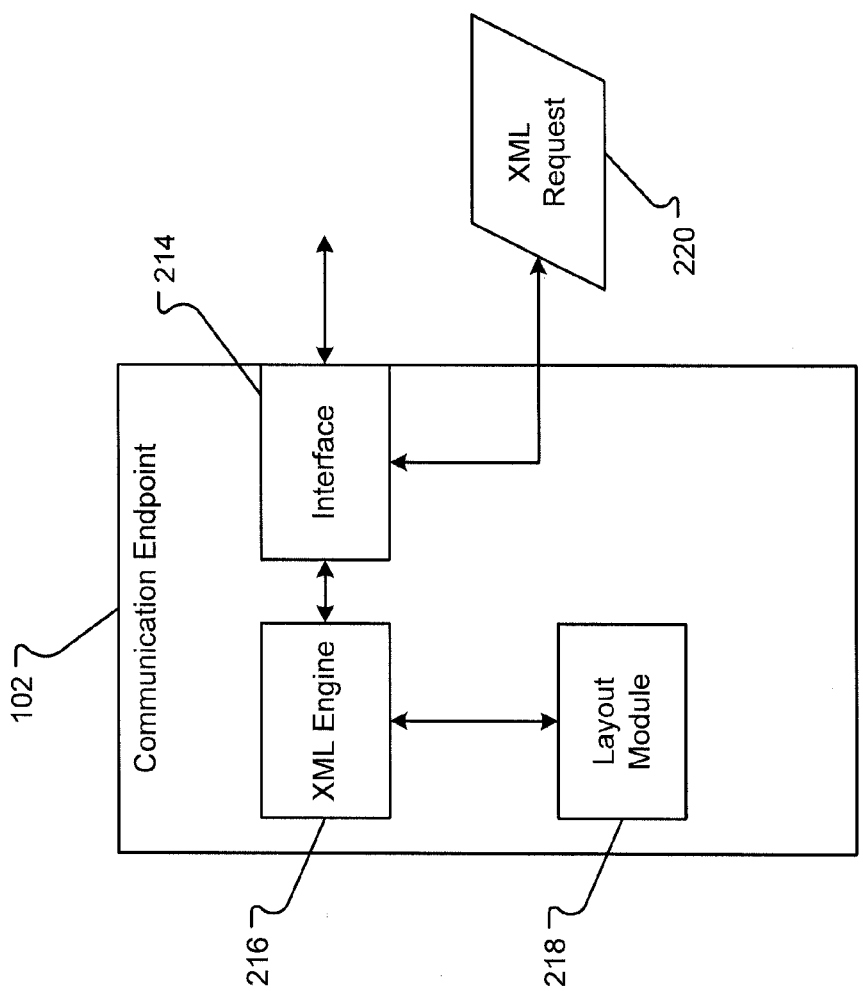

An embodiment of a communication endpoint 102 is shown in FIG. 2B. The communication endpoint 102 may include one or more components which could be hardware and/or software. The communication endpoint 102 can include an XML engine 216, an interface 214, and an interface 214, which may send an XML request 220. In embodiments, the interface 214 can communicate with the uplink/downlink interface 203 and/or the uplink/downlink interface 203. The interface 214 can receive the multimedia stream and present the display to the user of the communication endpoint 102. The user may enter changes to the display for the communication endpoint 102, which may be received by the XML engine 216.

The XML engine 216 may also receive the metadata 208 from the interface 214. The XML engine 216 may then modify the display, based on the metadata, to produce a different display. Thus, the XML engine 216 can change the vectors or other information associated with the zones within the display. The ability to change the vectors or other information may be based on the endpoint's rendering capabilities. Thus, that ability to scale received XML metadata is contingent on the device being capable of such scaling. The changed display can then be presented to the user. In other embodiments, the changed information is formed into an XML document and provided to the interface 214. In embodiments, the XML engine 216 is a XML parser. Thus, the layout module 218 can take the parsed output from XML engine 216 and construct the display. Thus, the XML engine 216 may not directly interact with the display.

The interface 214, in embodiments, can form a request to the uplink/downlink interface 203 to change the metadata and the layout associated with the multimedia stream. The XML request 220 can be sent through the uplink/downlink interface 203 to the XML engine 206, which can interpret the request and provide the requested configuration to the layout builder module 204 and/or conference engine 202. The XML request 220 allows the conference engine 202 to change the downlink of the conference for that specific communication endpoint 102 to reflect the changes provided in the XML request 220.

Figure 3A:
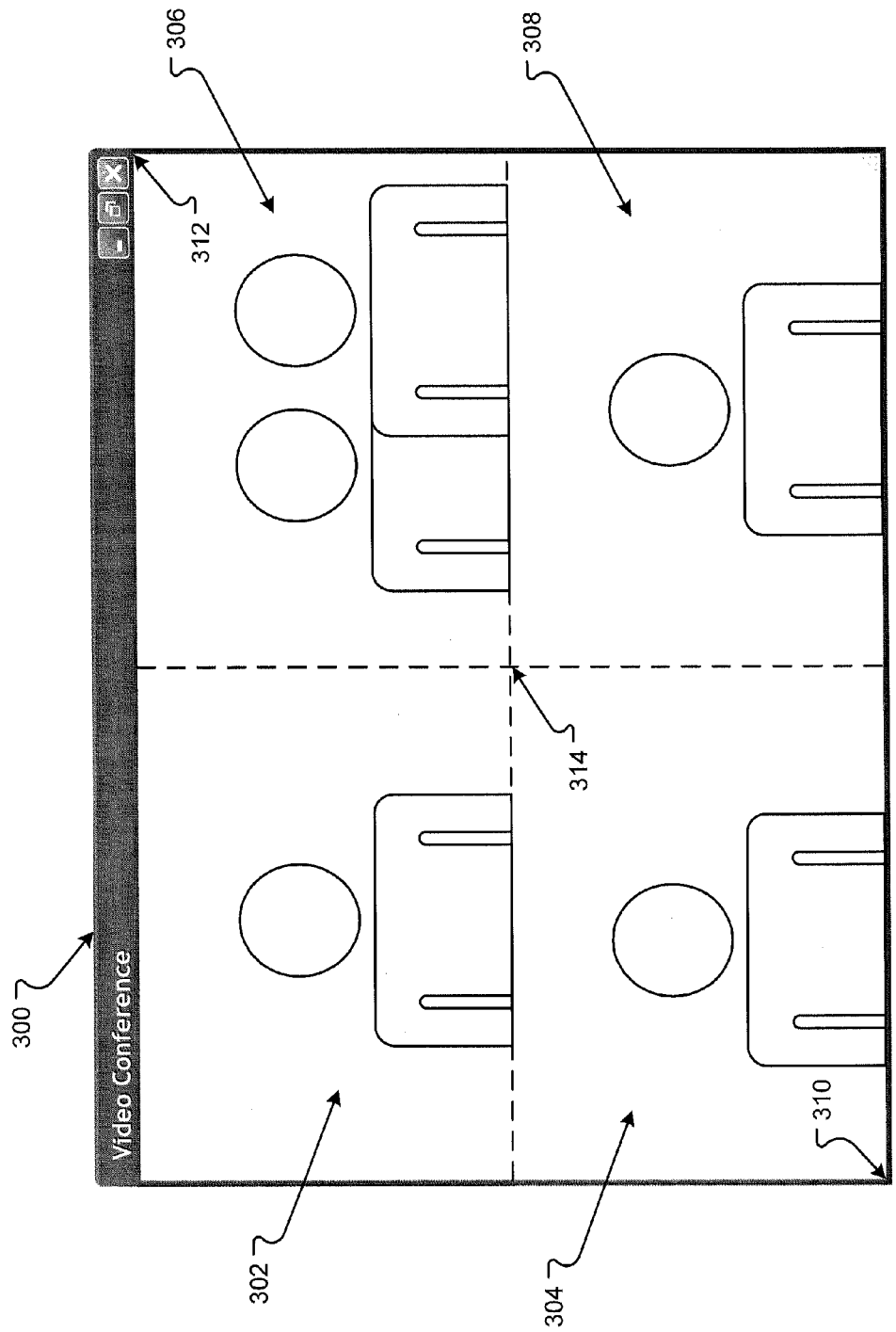
FIGS. 3A and 3B represent exemplary user interfaces of video conference displays before and after a reconfiguration.

An embodiment of a first display 300 is shown in FIG. 3A. The display 300 may be formed by two or more zones, which may each present a single view of the video from a communication endpoint 102. In the example shown in FIG. 3A, there are four different communication endpoints 102 participating in the video conference. Thus, the video conference display 300 is divided into four different zones 302, 304, 306, and 308. These four zones are displayed in a simple divided arrangement, such that each of the video streams from the four communication endpoints 102 are shown in equal portions of the video conference display 300.

The video conference display 300 can be described, by the layout builder module 204, by providing vectors, which allow the conference engine 202 and the communication endpoint 102 to understand how the display is formatted. For example, one corner of the display may be described by a vector "0, 0", which represents the point 310 shown in the display 300. Another vector may display the opposite corner 312, which location may depend on the display configuration. For example, if the display is 400 pixels tall and 600 pixels wide, the vector 312 would be 400,600. By providing just these two vectors, the communication endpoint 102 or the conference engine 202 can determine the size, with the number of participants, the arrangement of the conference display 300 may also be displayed. Each different zone may be also provided and described by two or more vectors. For example, zone 302 can be described by vectors 316 and 318. Likewise, vector 310 and 314 can describe the zone 304.

Figure 3B:
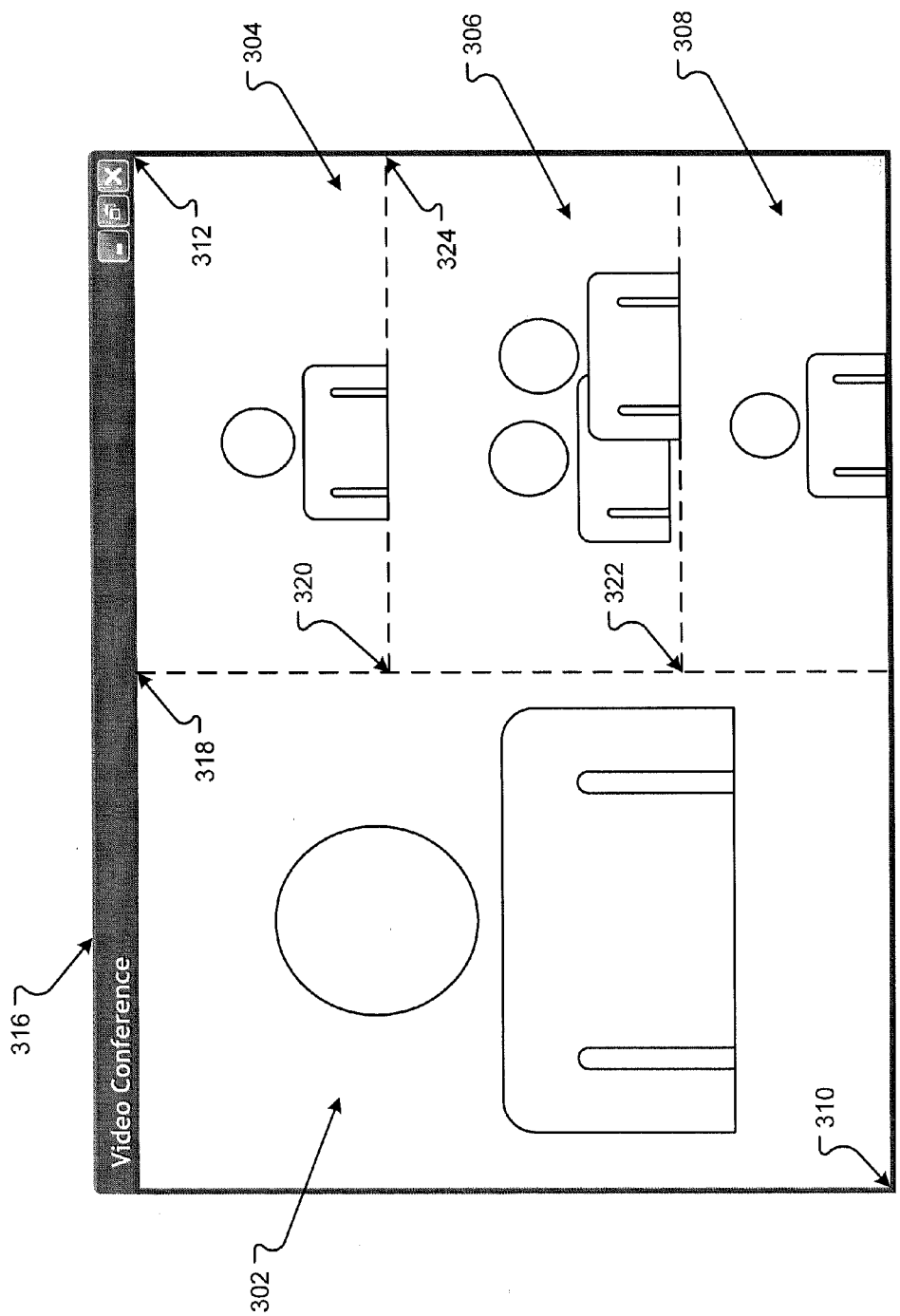

In embodiments, a second display 316 is shown in FIG. 3B. The second display 316 may be the result of a reconfiguration. Thus, the video conference display 316 in FIG. 3B has been changed, either by the communication endpoint 102 or by a request sent to the conference engine 202 and implemented by the layout builder module 204. Here, zone 302 is now changed to encompass half of the display with vectors 310 and 318 defining the corners of the zone. Meanwhile, zones 304, 306, and 308 occupy the second half of the screen and are arranged vertically in a "stack". The vectors, for the different zones, can also change. For example, zone 304 is now described by vectors 320 and 312. Likewise, zone 306 is described by new vectors 322 and 324. The vectors can describe the different zones and allow the communication endpoint 102 to either request this new layout or to establish the new layout using the multimedia stream parts that form the zones in the previous display 300 shown in FIG. 3A.

Figure 4A:
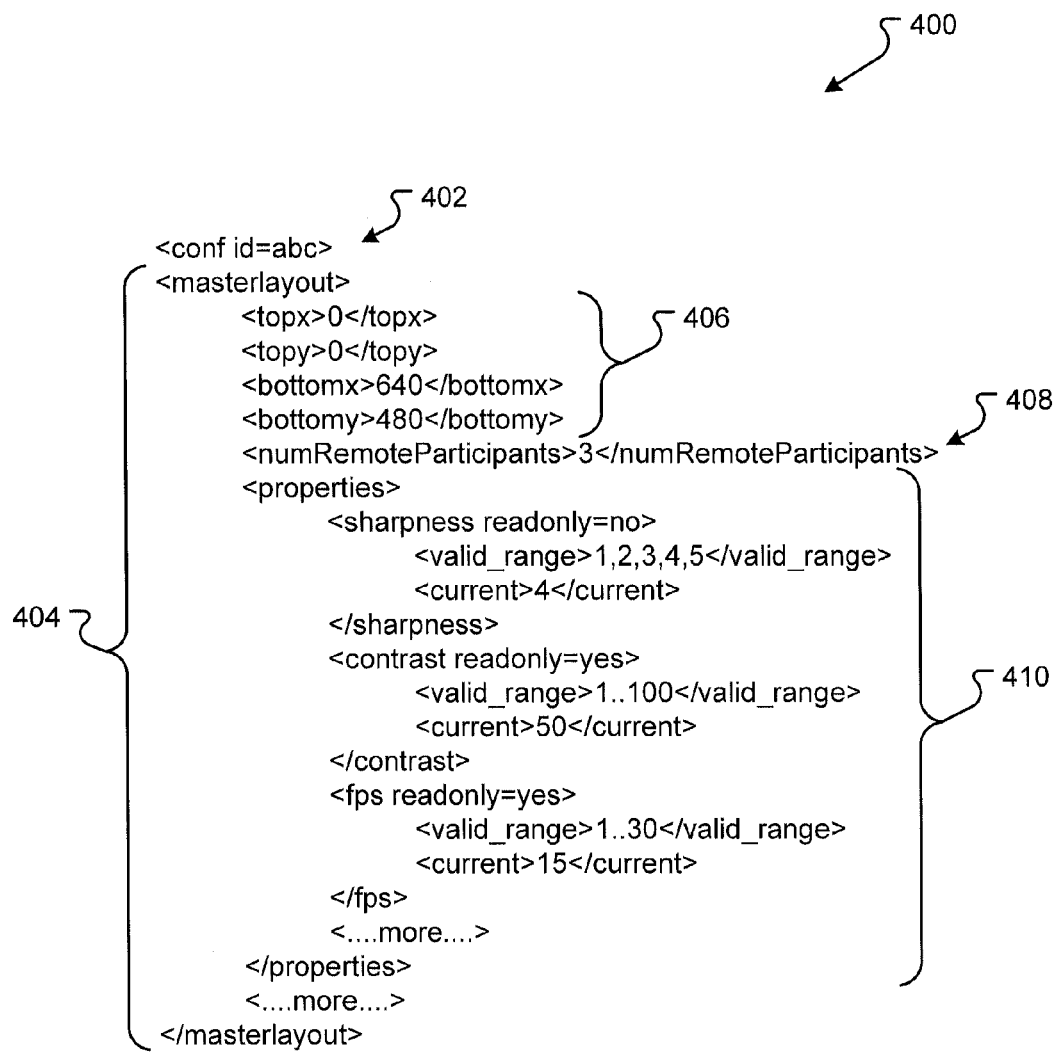
FIGS. 4A through 4C represent an embodiment of a data model operable to store metadata information for a multimedia stream.
Figure 4B:
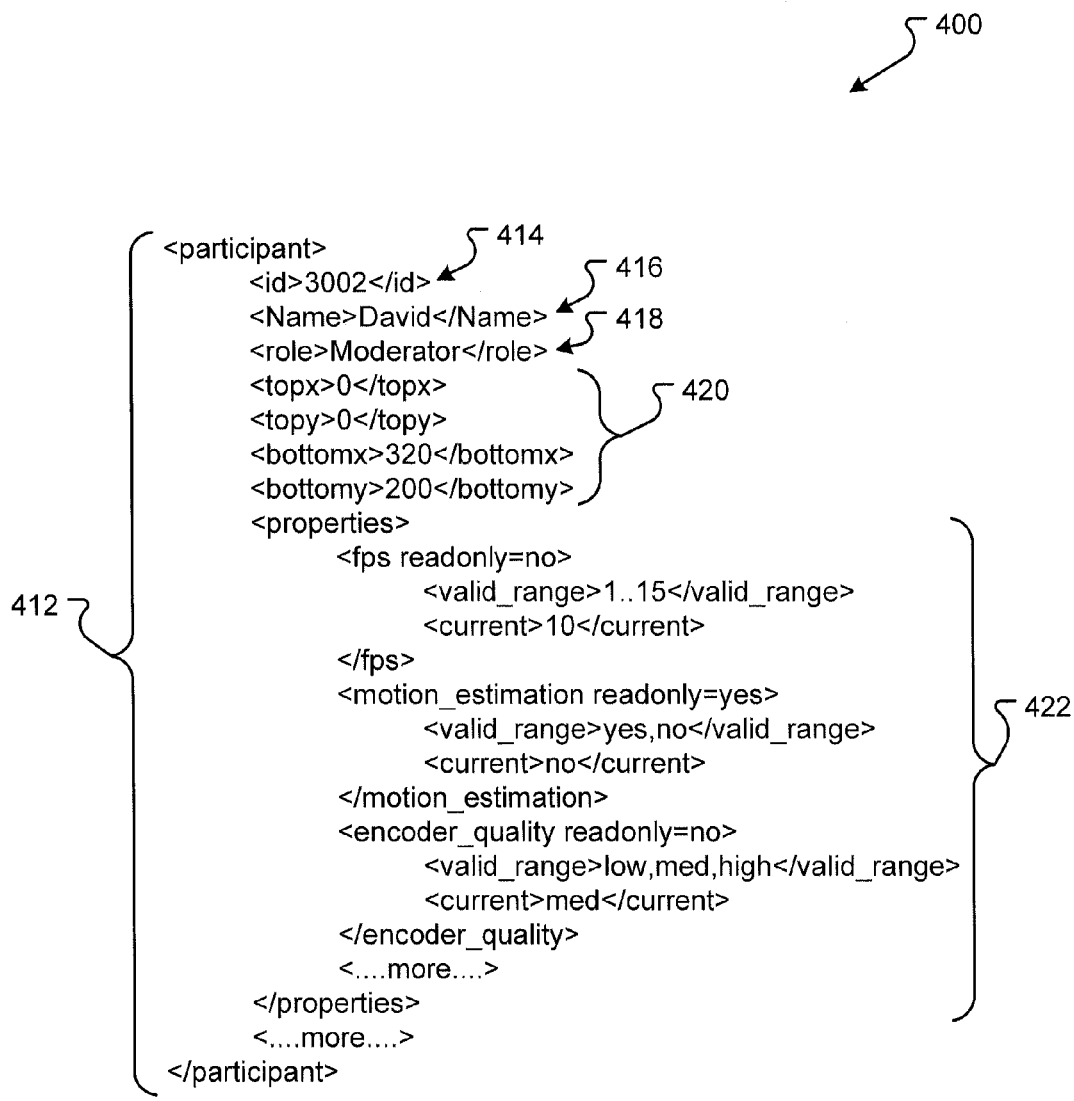
Figure 4C:
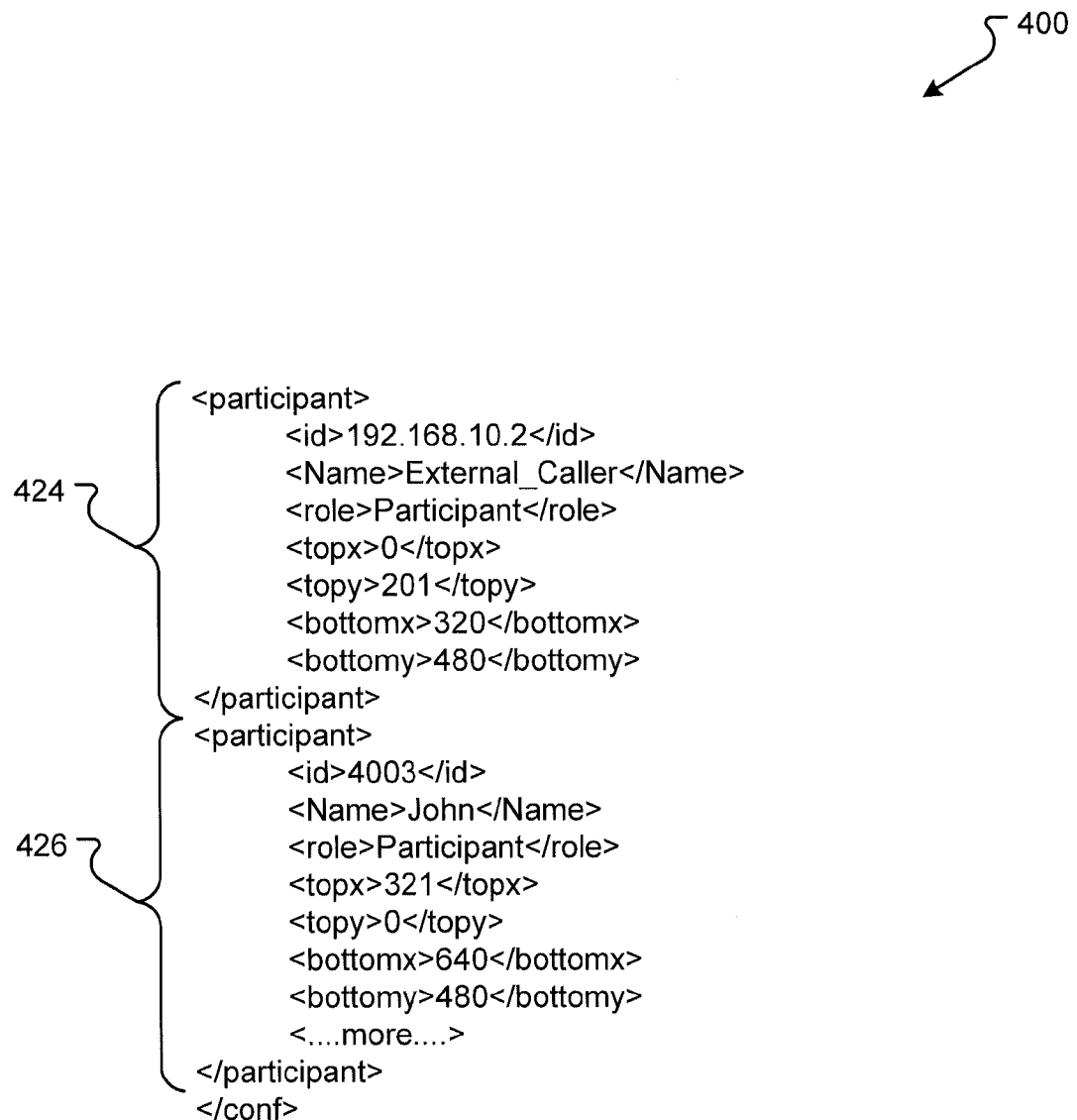

An embodiment of a metadata data structure 400, which may represent metadata that may be communicated by or to the XML engine 206, is shown in FIGS. 4A through 4C. The data structure 400 may include one or more portions that store information. Each portion may store one or more items of metadata information. The metadata 400 may be the same or similar to metadata 208, as described in conjunction with FIG. 2A. In embodiments, the metadata 400 can comprise different information that may be arranged in different sections. These different portions of the metadata 400 describe how the display interface is arranged, configured, or provided.

A conference identifier (ID) 402 may be presented in a first item of metadata. The conference ID 402 can uniquely identify the conference among many conferences. In embodiments, the conference ID 402 is a globally unique ID (GUID). The conference ID 402 can be used, by the conference engine 202, to determine which conference to modify or to which conference the metadata belongs.

A master layout section 404 provides general information about the conference display, as shown in FIG. 3A. Thus, the master layout 404 provides any information representing the entire screen and not necessarily one of the zones within the display 300, 316. Thus, the vectors for the display are shown in section 406, which can provide, for example, the vectors 310 and 312. These vectors 406 describe the outer limits of the display.

Metadata 408 provides the number of participants within the conference. Metadata 410 provide for the different values or parameter describing how the display is provided, including sharpness, contrast, frames per second (fps), and/or other information, which may be pertinent to how the display is provided. The master layout section 402 may be accompanied by one or more sections of metadata associated with the zones displaying the separate video from the separate communication endpoints 102, as shown FIGS. 4B and 4C.

An embodiment of a first participant's information is shown in section 412 of FIG. 4B. The participant may have metadata 414 providing an ID "3002". The ID metadata 414 may identify the participant either among all participants in the system or among the participants within the conference. The participant may also be identified by a name shown in metadata 416. The ID metadata 414 and name metadata 416 allows the communication endpoint 102 or the conference engine 202 extract multimedia information from the multimedia stream that is associated with a single participant.

In metadata 418, the role of the participant is described. In the embodiment shown, the participant with an ID "3002" shown in metadata 414 is the "moderator" of the conference. Other roles may be possible for the participants, including "participant". The moderator may have a more important role and may be displayed differently within display 300. Further, the moderator may change and, thus, the display for the moderator may also change.

The vectors for the zone, in which the moderator or the participant is shown, are provided in metadata 420. The vectors metadata 420 may comprise vector 310 and 314, as shown in FIG. 3A. These zone vectors describe a zone in which this particular participant's multimedia data is displayed. Metadata 422 provides the information for how the properties of this zone of the display are shown. Thus, the metadata 422 may include fps, motion estimation, encoder quality, and other information which may be relevant to this portion of the display.

In other embodiments, a participant multimedia stream can include multiple video feeds or other multimedia streams, e.g., whiteboard, center cam, ceiling cam, etc. A participant can uplink multiple streams simultaneously to the MCU. Other users may decide which of these multiple streams to choose when viewing the conference. Thus, the participant metadata can also include information for the two or more feeds from each participant. Thus, each user receiving the conference feed can select and change the different streams received from the other remote participant. In embodiments, the XML engine 216 can direct the MCU 216 to select one of the two or more inputs from a participant stream. Upon selecting one of the feeds, one or more parameters of the multimedia stream may change and need to be adjusted by the user. The changes in the download stream can be changed in on-going negotiations about the multimedia stream. If no user selects at least on feed from a participant, the MCU 216 may instruct the endpoint 102 to stop sending that feed.

Other metadata associated with other participants are shown in FIG. 4C. Thus, the information for a second participant is shown in metadata 424, and information for a third participant is shown in metadata 426. The metadata 424 and/or 426 may also describe the person being display, the status of the person (e.g., "moderator", "participant", etc.), how the participant is participating in the conference, the vectors that describe the zone in which the participant is displayed, and other information, which may be pertinent to the display and provide information to the communication endpoint 102 or the MCU 106 to change the display.

Figure 5:
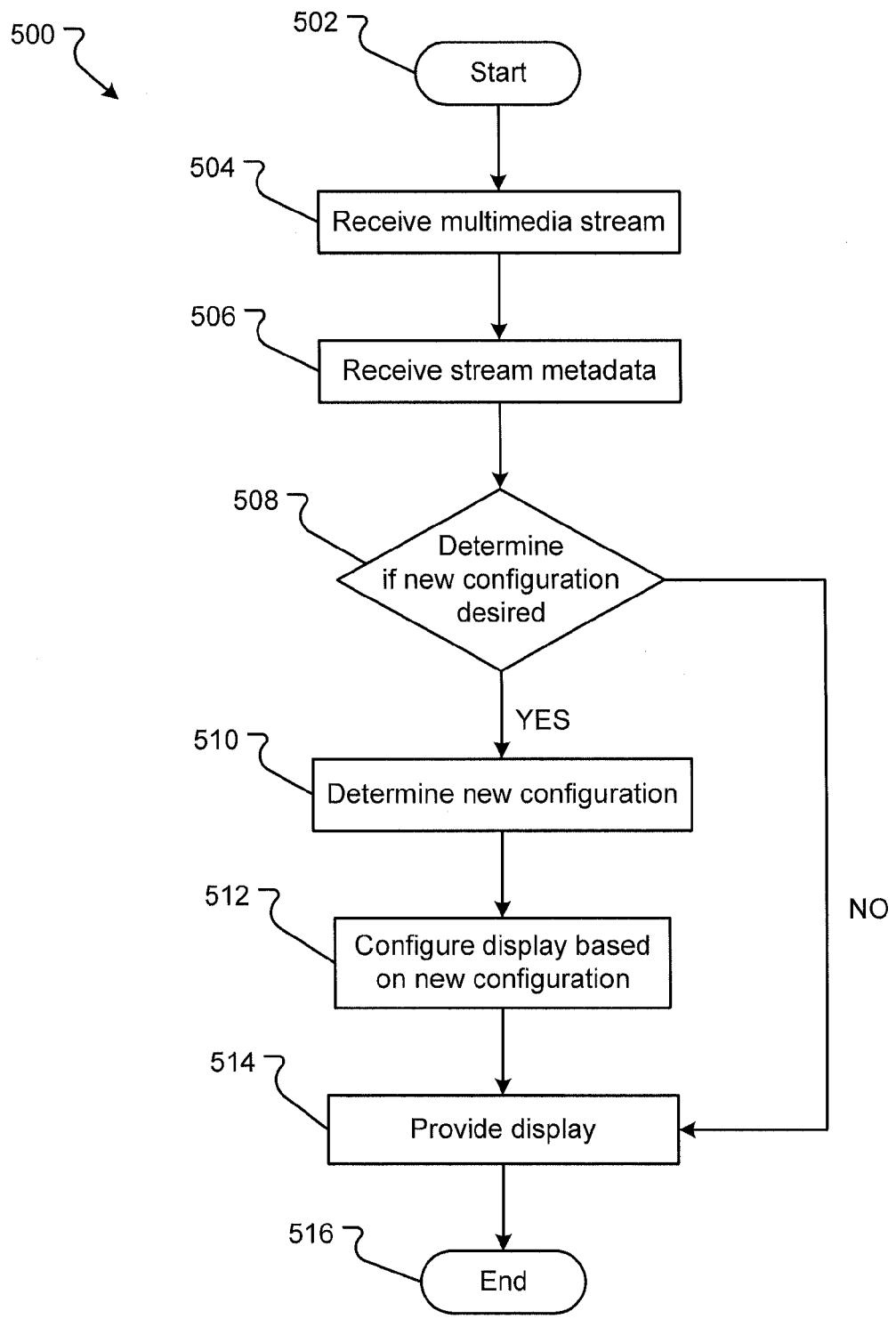
FIG. 5 is a flow diagram of an embodiment of a process for changing the configuration of a video conference display.

An embodiment of a method 500 for changing the configuration of a display for a video conference is shown in FIG. 5. Generally, the method 500 begins with a start operation 502 and terminates with an end operation 516. While a general order for the steps of the method 500 are shown in FIG. 5, the method 500 can include more or fewer steps or arrange the order of the steps differently than those shown in FIG. 5. The method 500 can be executed as a set of computer-executable instructions executed by a computer system and encoded or stored on a computer readable medium. Hereinafter, the method 500 shall be explained with reference to the systems, components, modules, data structures, user interfaces, etc. described in conjunction with FIGS. 1-4C.

A communication endpoint 102 can receive a video conference multimedia stream, in step 504. The multimedia stream may be transmitted to the communication endpoint, 102 by the conference engine 202 of a MCU 106, through an uplink/downlink interface 203. The interface 214 may receive the multimedia downlink stream from the MCU 106. The downlink multimedia stream may be composed of video information for two or more communication endpoints involved in the video conference.

The interface 214 can also receive metadata 208 from an uplink/downlink interface 203 from the MCU 106. The metadata 208 may be as shown in FIGS. 4A through 4C. In step 508, the communication endpoint 102 determines if a new configuration is desired. A new configuration may be desired if the user presets a standard or requested display for all video conferences that is different than the display configuration received from the MCU 106. In other embodiments, the communication endpoint 102 may receive one or more requests from the user to change the display of the video conference during the video conference. If the user does desire a new configuration, step 508 proceeds YES to step 510. If the user does not desire a new configuration, step 508 proceeds NO to step 514.

The rendering engine 212 can use prior layouts or endpoint history to construct an initial default rendering of the display. The received XML metadata can subsequently change the default layout. The communication endpoint 102 may then determine the new configuration for the video display, in step 510. A rendering engine 212 may determine the display configuration parameters for the new display. Thus, the rendering engine 212 can determine if the video conference display is to be configured such as that shown in FIG. 3-B. The configuration zones are determined with the corresponding vectors determined. The different discrete downlink streams from the various endpoints 102 are also determined. The discrete downlink streams are then associated with the zones, as configured in the new display, as shown in FIG. 3B. Once the configuration is determined, the rendering engine 212 can configure the display based on this new configuration, in step 512. The configure display may then be provided to a user interface display, in step 514.

Figure 6A:
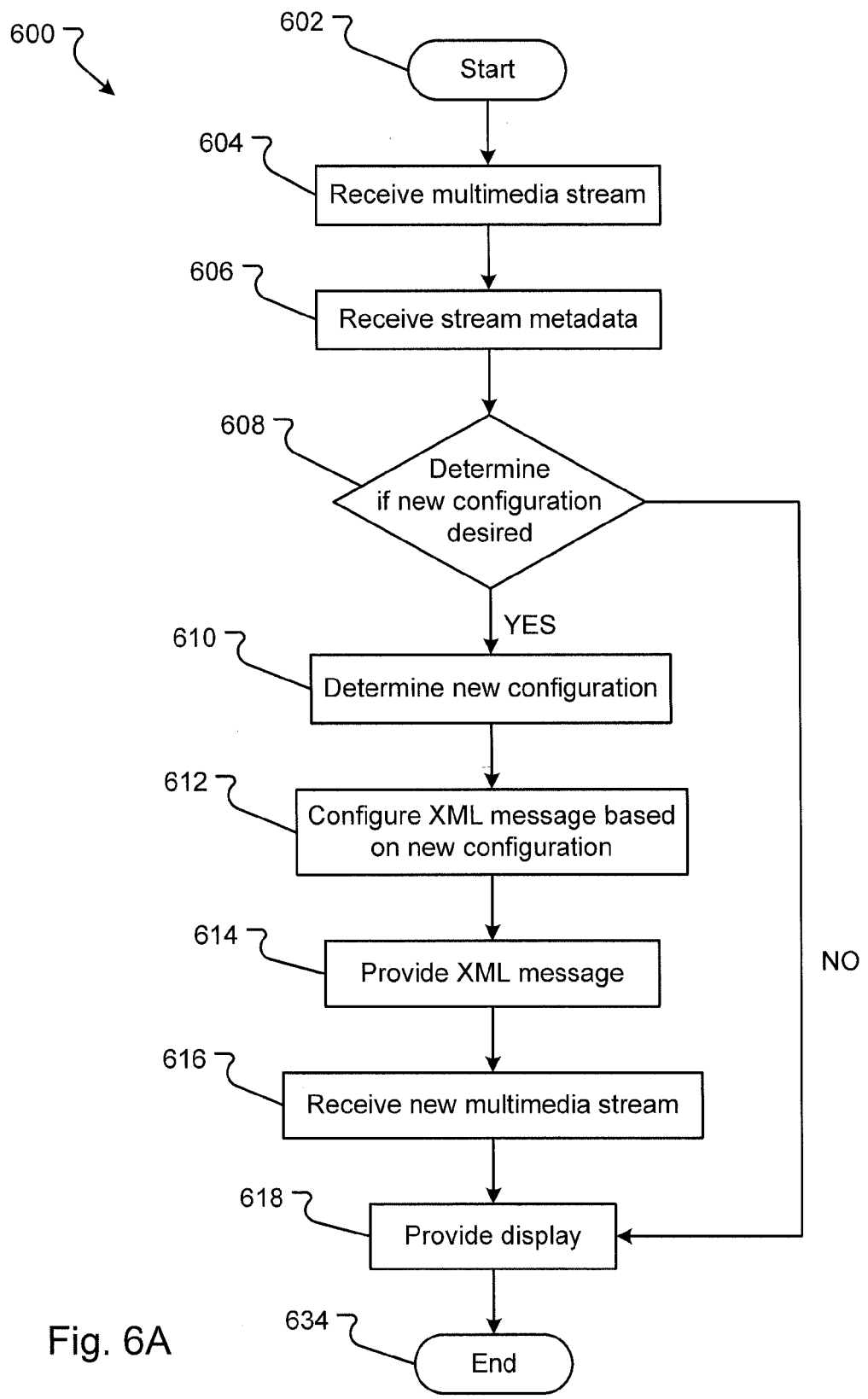
FIGS. 6A and 6B are flow diagrams of an embodiment of a process for modifying a video conference.
Figure 6B:
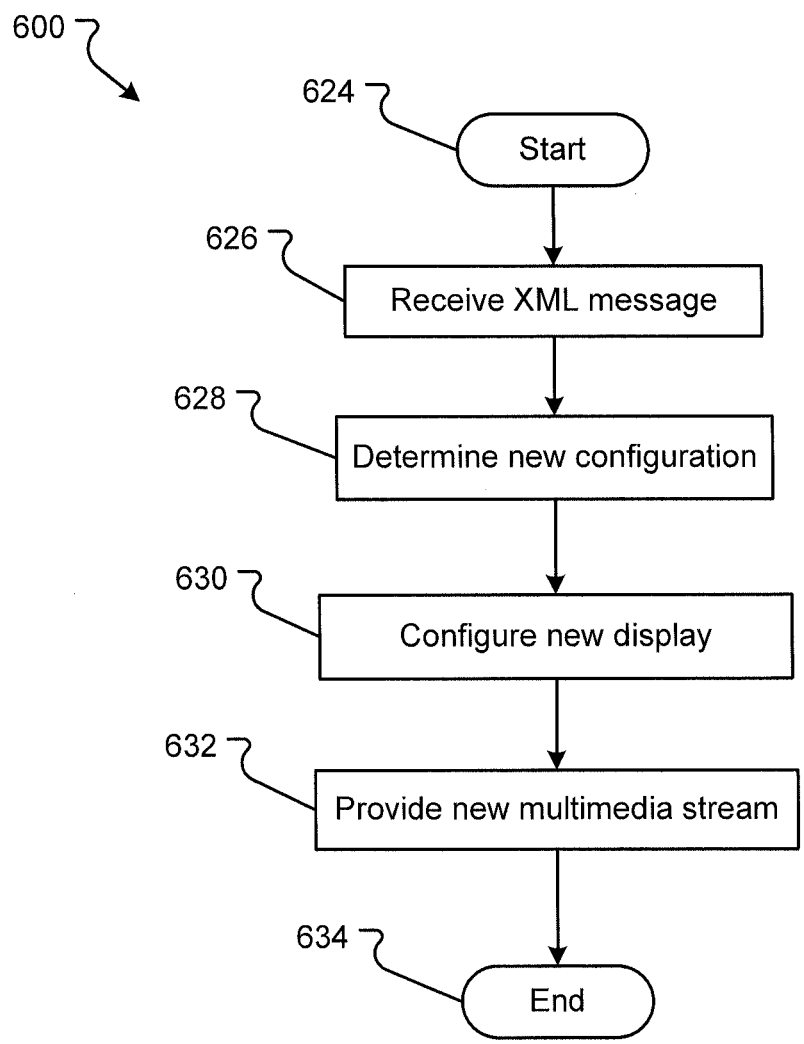

An embodiment of a method 600 for changing the display of a video conference is shown in FIG. 6A from the perspective of a communication endpoint 102. The method 600, from the perspective of an MCU 106, is shown in FIG. 6B. The method 600 will be explained in conjunction hereinafter. Generally, the method 600 begins with a start operation 602 and terminates with an end operation 634. While a general order for the steps of the method 600 are shown in FIG. 6, the method 600 can include more or fewer steps or arrange the order of the steps differently than those shown in FIG. 6. The method 600 can be executed as a set of computer-executable instructions executed by a computer system and encoded or stored on a computer readable medium. Hereinafter, the method 600 shall be explained with reference to the systems, components, modules, data structures, user interfaces, etc. described in conjunction with FIGS. 1-4C.

An interface 214, of a communication endpoint 102, receives a multimedia downlink stream, in step 604. In embodiments, the MCU 106 creates a downlink stream from two or more uplinked streams from two or more communication endpoints 102 involved in a video conference. The uplinked streams are included into a single downlink stream that is sent to the communication endpoints 102 with the uplink/downlink interface 203. This downlink multimedia stream composes the data required to display the video conference at the communication endpoint 102.

Further, the interface 214 can receive metadata 208 through uplink/downlink interface 203, in step 606. The metadata 208 may be the same or similar to that displayed in FIGS. 4A through 4C. This metadata describes the downlink multimedia stream received from the uplink/downlink interface 203 and the video display 300 that the stream produces. The metadata may be received by the interface 214 and sent to the XML engine 216.

The communication endpoint 102 determines if a new configuration is desired, in step 608. A new configuration may be desired if there is a standard setting made by the user of the communication endpoint 102 that is different from the configuration of the display 300, as received in the downlink multimedia stream. In other embodiments, the communication endpoint 102 may receive real time changes to the display from a user who is involved in the video conference. These configuration changes are received and interpreted by the XML engine 216. If there are no configuration changes needed, step 608 proceeds NO to step 618. If there are configurations needed, step 608 proceeds YES to step 610.

In step 610, the XML engine 216 determines the new configuration that is requested. For example, the user may desire to change the display 300 from that shown in FIG. 3A to the display 316 shown in FIG. 3B. As such, the XML engine 216 determines the changes in the vectors 310, 316, 318, 314, and/or 312 that are required to change the display from that shown in FIG. 3A to that shown in FIG. 3B. Thus, the XML engine 216 makes a listing of all the changes required to go from a first display 300 to a second display 316. These changes may then be incorporated into an XML message 220, configured by the XML engine 216, as based on the new configuration, in step 612. This XML message 220 is given to the interface 214. The interface 214 sends the XML message 220 through the uplink/downlink interface 203 to the XML engine 206 at the MCU 106.

Referring now to FIG. 6B, the MCU 106 can receive the XML message 220, in step 626. In embodiments, the uplink/downlink interface 203 receives the XML message 220. This XML message 220 may then be forwarded to the XML engine 206. The XML engine 206 can interpret the XML message 220 to determine the new configuration, in step 628. Thus, the XML engine 206 can read the changes in the vectors to determine how the new display is supposed to be generated. The determinate changes are sent, by the XML engine 206, to the layout builder module 204.

The layout builder module 204 can reconfigure the downlink stream for the communication endpoint 102, in step 630. Thus, the layout builder module 204 can receive the downlink stream, as composed for all communication endpoints 102, from the conference engine 202. The layout builder module 204 may then reconfigure the display by changing the parameters of the display and creating new metadata 400. The newly changed downlink stream can be then sent through the uplink/downlink interface 203 to the communication endpoint 102, in step 632. This newly configured multimedia stream may be sent to only one communication endpoint 102. Thus, each communication endpoint 102 and/or 104 can have a uniquely developed and configured user interface display 300 for the video conference. In this way, the communication endpoint 102 can change the layout of the video conference without having to make changes to the communication endpoint 102.

Returning to FIG. 6A, the interface 214 of the communication endpoint 102 can receive the new multimedia stream, in step 616. This new multimedia stream may then be presented to the user interface display of the communication endpoint 102 to provide the new configured display, in step 618.

Figure 7:
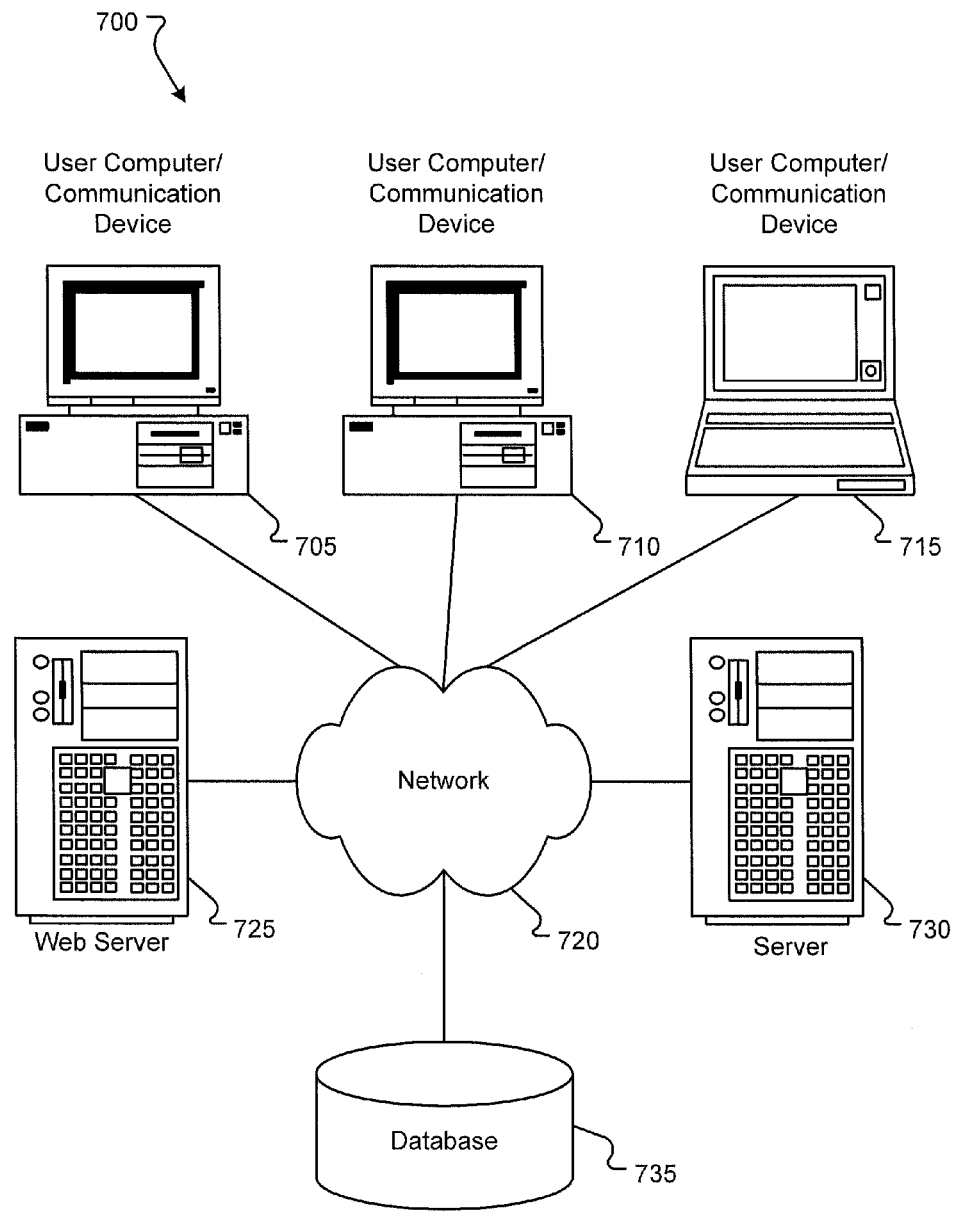
FIG. 7 is a block diagram of an embodiment of a computing environment operable to execute the embodiments described herein.

FIG. 7 illustrates a block diagram of a computing environment 700 that may function as system or environment for the embodiments described herein. The system 700 includes one or more user computers 705, 710, and 715. The user computers 705, 710, and 715 may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 705, 710, 715 may also have any of a variety of applications, including for example, database client and/or server applications, and web browser applications. Alternatively, the user computers 705, 710, and 715 may be any other electronic device, such as a thin-client computer, Internet-enabled mobile telephone, and/or personal digital assistant, capable of communicating via a network (e.g., the network 720 described below) and/or displaying and navigating web pages or other types of electronic documents. Although the exemplary system 700 is shown with three user computers, any number of user computers may be supported.

System 700 further includes a network 720. The network 720 can be any type of network familiar to those skilled in the art that can support data communications using any of a variety of commercially-available protocols, including, without limitation, TCP/IP, SNA, IPX, AppleTalk, and the like. Merely by way of example, the network 720 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system 700 may also include one or more server computers 725, 730. One server may be a web server 725, which may be used to process requests for web pages or other electronic documents from user computers 705, 710, and 715. The web server can be running an operating system including any of those discussed above, as well as any commercially-available server operating systems. The web server 725 can also run a variety of server applications, including HTTP servers, FTP servers, CGI servers, database servers, Java servers, and the like. In some instances, the web server 725 may publish operations available operations as one or more web services.

The system 700 may also include one or more file and or/application servers 730, which can, in addition to an operating system, include one or more applications accessible by a client running on one or more of the user computers 705, 710, 715. The server(s) 730 may be one or more general purpose computers capable of executing programs or scripts in response to the user computers 705, 710 and 715. As one example, the server may execute one or more web applications. The web application may be implemented as one or more scripts or programs written in any programming language, such as Java™, C, C#™ or C++, and/or any scripting language, such as Perl, Python, MySQL, or TCL, as well as combinations of any programming/scripting languages. The application server(s) 730 may also include database servers, including without limitation those commercially available from Oracle, Microsoft, Sybase™, IBM™ and the like, which can process requests from database clients running on a user computer 705.

The web pages created by the web application server 730 may be forwarded to a user computer 705 via a web server 725. Similarly, the web server 725 may be able to receive web page requests, web services invocations, and/or input data from a user computer 705 and can forward the web page requests and/or input data to the web application server 730. In further embodiments, the server 730 may function as a file server. Although for ease of description, FIG. 5 illustrates a separate web server 725 and file/application server 730, those skilled in the art will recognize that the functions described with respect to servers 725, 730 may be performed by a single server and/or a plurality of specialized servers, depending on implementation-specific needs and parameters. The computer systems 705, 710, and 715, file server 725 and/or application server 730 may function as servers or other systems described herein.

The system 700 may also include a database 735. The database 735 may reside in a variety of locations. By way of example, database 735 may reside on a storage medium local to (and/or resident in) one or more of the computers 705, 710, 715, 725, 730. Alternatively, it may be remote from any or all of the computers 705, 710, 715, 725, 730, and in communication (e.g., via the network 720) with one or more of these. In a particular set of embodiments, the database 735 may reside in a storage-area network ("SAN") familiar to those skilled in the art. Similarly, any necessary files for performing the functions attributed to the computers 705, 710, 715, 725, 730 may be stored locally on the respective computer and/or remotely, as appropriate. In one set of embodiments, the database 735 may be a relational database, such as Oracle 10i™, that is adapted to store, update, and retrieve data in response to SQL-formatted commands. Database 735 may be the same or similar to the database used herein.

Figure 8:
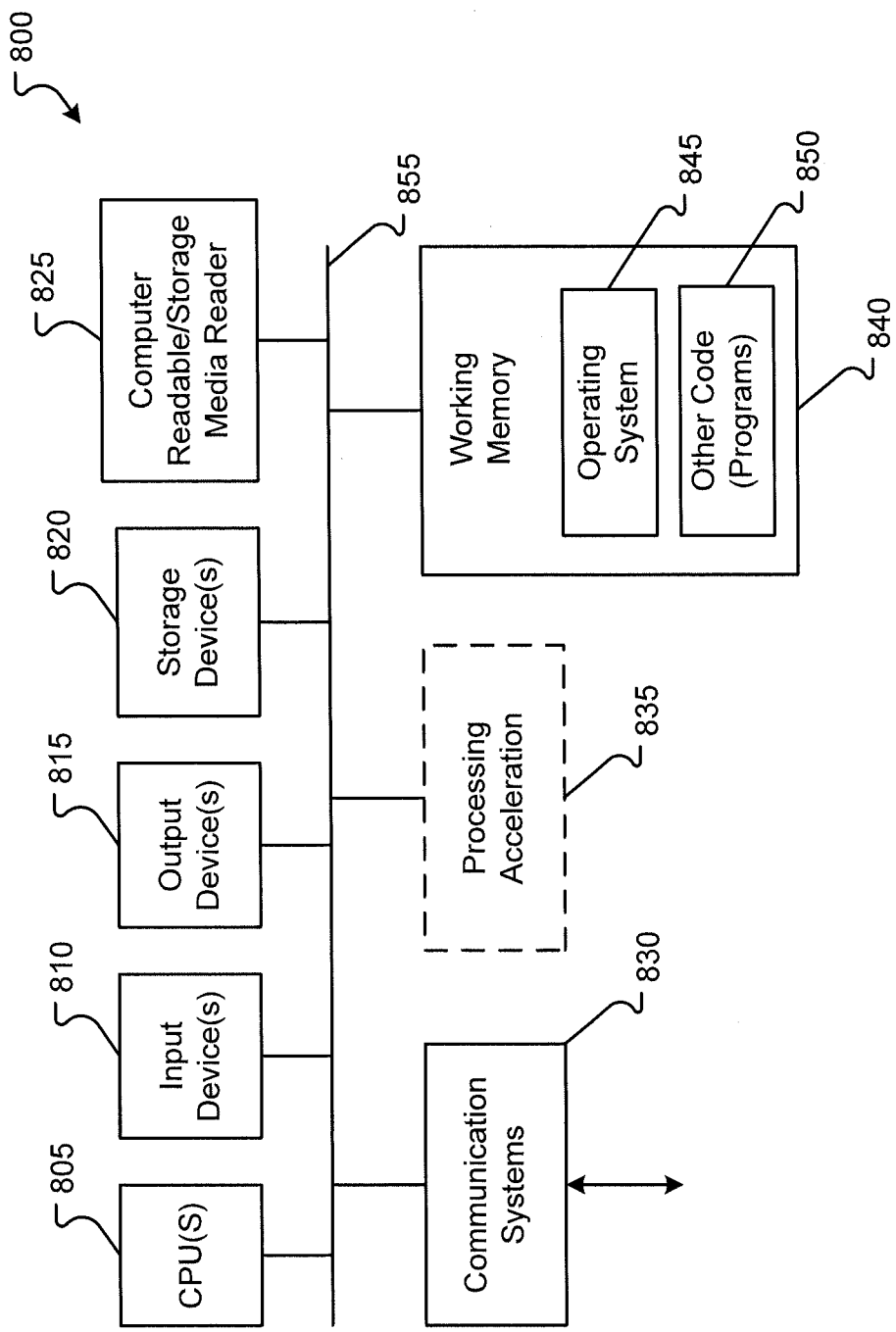
FIG. 8 is a block diagram of an embodiment of a computer or computing system environment operable to execute as the one or more devices described herein.

FIG. 8 illustrates one embodiment of a computer system 800 upon which servers or other systems described herein may be deployed or executed. The computer system 800 is shown comprising hardware elements that may be electrically coupled via a bus 855. The hardware elements may include one or more central processing units (CPUs) 805; one or more input devices 810 (e.g., a mouse, a keyboard, etc.); and one or more output devices 815 (e.g., a display device, a printer, etc.). The computer system 800 may also include one or more storage device 820. By way of example, storage device(s) 820 may be disk drives, optical storage devices, solid-state storage device such as a random access memory ("RAM") and/or a read-only memory ("ROM"), which can be programmable, flash-updateable and/or the like.

The computer system 800 may additionally include a computer-readable storage media reader 825; a communications system 830 (e.g., a modem, a network card (wireless or wired), an infra-red communication device, etc.); and working memory 840, which may include RAM and ROM devices as described above. In some embodiments, the computer system 800 may also include a processing acceleration unit 835, which can include a DSP, a special-purpose processor and/or the like.

The computer-readable storage media reader 825 can further be connected to a computer-readable storage medium, together (and, optionally, in combination with storage device (s) 820) comprehensively representing remote, local, fixed, and/or removable storage devices plus storage media for temporarily and/or more permanently containing computer-readable information. The communications system 830 may permit data to be exchanged with the network 820 and/or any other computer described above with respect to the system 800. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 800 may also comprise software elements, shown as being currently located within a working memory 840, including an operating system 845 and/or other code 850, such as program code implementing the servers or devices described herein. It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other types of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the embodiments have been described in detail herein, it is to be understood that the inventive concepts may be otherwise variously embodied and employed, and that the appended claims are intended to be construed to include such variations, except as limited by the prior art.

What is claimed is:

1. A non-transient computer program product including computer executable instructions stored onto a computer readable medium which, when executed by a processor of a computer, causes the computer to perform a method for changing a display of a video conference, the instructions comprising:
   instructions to receive a single multimedia stream, wherein the single multimedia stream is associated with the video conference, and wherein the video conference has a first display format for display of the video conference;
   instructions to receive metadata associated with the single multimedia stream;
   instructions to determine a new configuration for a second display of the video conference, wherein the new configuration is to mute a selected participant in the single multimedia stream, wherein muting the selected participant in the single multimedia stream causes the selected participant's video to be collapsed into an icon or thumbnail;
   instructions to configure the second display; and
   instructions to provide the second display for the video conference in the single multimedia stream.

2. The computer program product as defined in claim 1, wherein the metadata includes configuration information for the first display.

3. The computer program product as defined in claim 2, wherein the configuration information includes a description of the first display format.

4. The computer program product as defined in claim 3, wherein the description includes a master layout of a first conference display and participant metadata.

5. The computer program product as defined in claim 4, wherein the participant metadata describes a zone within the conference display.

6. The computer program product as defined in claim 4, wherein the master layout includes at least one of a conference identifier, a vector describing the size of the video conference display, a number of participants, and a property.

7. The computer program product as defined in claim 6, wherein the property can include at least one of frames per second, sharpness, or contrast.

8. The computer program product as defined in claim 7, wherein the property is the same for the zone and at least one other zone.

9. A method for changing a display of a video conference, comprising:
   a multipoint control unit (MCU) receiving at least two uplinked multimedia streams from at least two communication endpoints;
   the MCU creating a downlink multimedia stream from the at least two uplinked multimedia streams, wherein the downlink multimedia stream is associated with a video conference, and wherein the video conference has a first display format for display of the video conference;
   the MCU generating metadata about the downlink multimedia stream;
   the MCU sending the metadata associated with the downlink multimedia stream to the at least two communication endpoints;
   the MCU sending the downlink multimedia stream to the at least two communication endpoints;
   the MCU receiving, from a first communication endpoint of the at least two communication endpoints, a request to change the first display format to a second display format, wherein the request to change the first display format to the second display format is based on a request to mute a selected participant in the downlink multimedia stream, wherein muting the selected participant in the downlink multimedia stream causes the selected participant's video to be collapsed into an icon or thumbnail;
   reconfiguring the downlink stream to provide second display format to the first communication endpoint;
   the MCU generating second metadata about the reconfigured downlink multimedia stream;
   the MCU sending the second metadata associated with the multimedia stream to the first communication endpoint; and
   the MCU sending the reconfigured downlink multimedia stream to the first communication endpoint.

10. The method as defined in claim 9, wherein the request is an (Extensible Markup Language) XML document.

11. The method as defined in claim 10, wherein the XML document includes changes to the first display format.

12. The method as defined in claim 9, wherein a second communication endpoint does not receive the reconfigured downlink multimedia stream.

13. The method as defined in claim 12, wherein a third communication endpoint receives a third downlink multimedia stream having a third display format.

14. A communication system, comprising:
   a first communication endpoint;
   a multipoint control unit (MCU) in communication with the first communication endpoint, the first MCU comprising:
   a memory;

a processor in communication with the memory, the processor operable to execute:
  a conference engine operable to conduct a conference with the first communication endpoint;
  a layout builder module operable to determine a first display format for the conference and receive, from the first communication endpoint, a request to change the first display format for the conference to a second display format for the conference, wherein the request to change the first display format for the conference to the second display format for the conference is based on a request to mute a selected participant in the conference, wherein muting the selected participant in the conference causes the selected participant's video to be collapsed into an icon or thumbnail;
  an XML engine operable to create metadata associated with the first display format; and
  a metadata interface operable to send the metadata to the first communication endpoint.

15. The communication system as defined in claim 14, further comprising an uplink/downlink interface operable to send a downlink multimedia stream to the first communication endpoint, wherein the downlink multimedia stream includes multimedia data for the conference.

16. The communication system as defined in claim 15, wherein the metadata describes the downlink multimedia stream.

17. The communication system as defined in claim 16, wherein the first communication endpoint comprises:
  an interface operable to receive at least one of the metadata or the downlink multimedia stream; and
  an XML editor operable to interpret the metadata; and
  a rendering engine operable to reconfigure the first display format, based on the metadata.

18. The communication system as defined in claim 17, wherein the first communication endpoint further comprises a requester operable to send a XML request to the MCU to change the first display format for the first communication endpoint.

19. The computer program product as defined in claim 1, further comprising instructions to modify a remote zone of a second selected participant in the single multimedia stream, wherein modifying the remote zone of the second selected participant in the single multimedia stream comprises adding at least one of: a menu to initiate a side bar conference, a history of past interactions of the video conference, a calendar related to the video conference, and an email related to the video conference.

* * * * *